United States Patent
Kita et al.

(10) Patent No.: US 10,478,896 B2
(45) Date of Patent: Nov. 19, 2019

(54) POROUS COPPER BODY, POROUS COPPER COMPOSITE PART, METHOD FOR MANUFACTURING POROUS COPPER BODY, AND METHOD FOR MANUFACTURING POROUS COPPER COMPOSITE PART

(71) Applicant: MITSUBISHI MATERIALS CORPORATION, Tokyo (JP)

(72) Inventors: Koichi Kita, Tokyo (JP); Jun Kato, Kitamoto (JP); Toshihiko Saiwai, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/579,668

(22) PCT Filed: May 23, 2016

(86) PCT No.: PCT/JP2016/065122
§ 371 (c)(1),
(2) Date: Dec. 5, 2017

(87) PCT Pub. No.: WO2016/199565
PCT Pub. Date: Dec. 15, 2016

(65) Prior Publication Data
US 2018/0161876 A1 Jun. 14, 2018

(30) Foreign Application Priority Data
Jun. 12, 2015 (JP) .................. 2015-119694

(51) Int. Cl.
*B22F 3/00* (2006.01)
*B22F 3/11* (2006.01)
(Continued)

(52) U.S. Cl.
CPC .............. *B22F 3/1143* (2013.01); *B22F 1/00* (2013.01); *B22F 1/004* (2013.01); *B22F 3/11* (2013.01);
(Continued)

(58) Field of Classification Search
None
See application file for complete search history.

(56) References Cited

U.S. PATENT DOCUMENTS

| 2,203,895 A | 6/1940 | Davis et al. |
| 4,066,450 A | 1/1978 | Takeuchi et al. |

(Continued)

FOREIGN PATENT DOCUMENTS

| CN | 1133895 A | 10/1996 |
| CN | 1147030 A | 4/1997 |

(Continued)

OTHER PUBLICATIONS

Office Action dated Dec. 3, 2018, issued for the Chinese patent application No. 201680024898.3 and English translation thereof.
(Continued)

*Primary Examiner* — Seth Dumbris
(74) *Attorney, Agent, or Firm* — Locke Lord LLP (57) ABSTRACT

A porous copper body including a skeleton having a three-dimensional network structure is provided. An oxidation-reduction layer formed by an oxidation-reduction treatment is provided on a surface of the skeleton, and the average crystal grain size of an entirety including the skeleton and the oxidation-reduction layer is 5% or more of the diameter of the skeleton.

12 Claims, 8 Drawing Sheets

(51) Int. Cl.
- *B22F 1/00* (2006.01)
- *B22F 7/04* (2006.01)
- *C22C 9/00* (2006.01)
- *C22F 1/08* (2006.01)
- *B22F 7/00* (2006.01)
- *B22F 7/06* (2006.01)
- *C22C 47/20* (2006.01)
- *C22F 1/00* (2006.01)
- *F28F 1/10* (2006.01)
- *B32B 15/01* (2006.01)

(52) U.S. Cl.
CPC ............ *B22F 3/1103* (2013.01); *B22F 7/002* (2013.01); *B22F 7/004* (2013.01); *B22F 7/04* (2013.01); *B22F 7/062* (2013.01); *C22C 9/00* (2013.01); *C22C 47/20* (2013.01); *C22F 1/08* (2013.01); *B32B 15/01* (2013.01); *C22F 1/00* (2013.01); *F28F 1/10* (2013.01); *Y10T 428/12153* (2015.01)

(56) References Cited

U.S. PATENT DOCUMENTS

| | | | |
|---|---|---|---|
| 5,378,426 | A | 1/1995 | Geibel et al. |
| 6,616,727 | B1 | 9/2003 | Koyama et al. |
| 2009/0165651 | A1* | 7/2009 | Burgess ............ B01D 39/2044 95/284 |
| 2013/0305673 | A1* | 11/2013 | Zeller ................ B01D 39/2034 55/523 |

FOREIGN PATENT DOCUMENTS

| | | |
|---|---|---|
| CN | 1153491 A | 7/1997 |
| CN | 101027428 A | 8/2007 |
| JP | 07-006758 A | 1/1995 |
| JP | 08-145592 A | 6/1996 |
| JP | 11-217680 A | 8/1999 |
| JP | 2000-192107 * | 7/2000 ............... B22F 3/11 |
| JP | 2000-192107 A | 7/2000 |
| JP | 2003-268410 A | 9/2003 |
| JP | 2009-079766 A | 4/2009 |
| JP | 2010-500771 A | 1/2010 |
| JP | 2011-111652 A | 6/2011 |
| JP | 5166615 B1 | 3/2013 |
| JP | 2013-189676 | 9/2013 |
| WO | 2008/019992 A1 | 2/2008 |
| WO | 2016/063905 A1 | 4/2016 |

OTHER PUBLICATIONS

Search Report dated Nov. 6, 2018, issued for the European patent application No. 16807272.6.
International Search Report dated Aug. 16, 2016, issued for PCT/JP2016/065122 and English translation thereof.
International Search Report dated Jan. 19, 2016, issued for PCT/JP2015/079687 and English translation thereof.
Office Action dated Jun. 13, 2017, issued for the Japanese Patent Application No. 2016-150199 and English ranslation thereof.
Yong Tang et al., "Feasibility study of porous copper fiber sintered felt: A novel porous flow field in proton exchange membrane fuel cells", International Journal of Hydrogen Energy, Elsevier Science Publishers B.V., Barking, GB, vol. 35, No. 18, Sep. 1, 2010, pp. 9661-9677.
Search Report dated Jun. 4, 2018, issued for the European patent application No. 15853350.5.
Office Action dated Nov. 20, 2018, issued for U.S. Appl. No. 15/518,902.
Office Action dated Apr. 8, 2019, issued for U.S. Appl. No. 15/518,902.

* cited by examiner

POROUS COPPER BODY, POROUS COPPER COMPOSITE PART, METHOD FOR MANUFACTURING POROUS COPPER BODY, AND METHOD FOR MANUFACTURING POROUS COPPER COMPOSITE PART

CROSS REFERENCE TO RELATED APPLICATIONS

This application is related to co-pending application: "POROUS COPPER BODY, POROUS COPPER COMPOSITE PART, METHOD FOR MANUFACTURING POROUS COPPER BODY, AND METHOD FOR MANUFACTURING POROUS COPPER COMPOSITE PART" filed even date herewith in the names of Koichi KITA; Jun KATO and Toshihiko SAIWAI as a national phase entry of PCT/JP2016/065160, which application is assigned to the assignee of the present application and is incorporated by reference herein.

TECHNICAL FIELD

The present invention relates to a porous copper body made of copper or a copper alloy, a porous copper composite part in which the porous copper body is bonded to a main body of the composite part, a method for manufacturing the porous copper body, and a method for manufacturing the porous copper composite part.

Priority is claimed on Japanese Patent Application No. 2015-119694, filed on Jun. 12, 2015, the content of which is incorporated herein by reference.

BACKGROUND ART

The above-mentioned porous copper body and the porous copper composite part are used, for example, as electrodes and current collectors in various batteries, heat exchanger components, silencing components, filters, impact-absorbing components, and the like.

For example, PTL 1 discloses a porous metal body in which the surface of an uneven metal body with a three-dimensional network structure is reformed into a porous metal film.

PTL 2 discloses a heat exchange member in which a porous copper layer is formed on the surface of a copper tube by sintering a copper powder.

In PTL 1, the uneven metal body with the three-dimensional network structure is subjected to an oxidation treatment to form the oxidation film, and then subjected to a reduction treatment. Thereby, the surface of the uneven metal body is reformed into the porous metal film.

In PTL 2, a powder made of copper or a copper alloy is used as a raw material, and the raw material powder is temporarily bonded to the surface of the copper tube using a binder, followed by an oxidation treatment and a reduction treatment to form the porous copper layer.

CITATION LIST

Patent Literature

PTL 1: Japanese Patent Publication No. 5166615
PTL 2: Japanese Unexamined Patent Application, First Publication No. H11-217680

SUMMARY OF INVENTION

Technical Problem

As disclosed in PTLs 1 and 2, in a case of simply performing an oxidation-reduction treatment, the crystal grain size of the formed oxidation-reduction layer is very fine. Therefore, in a region of the oxidation-reduction layer, many crystal grain boundaries are present and thus there is a concern that thermal conductivity and electrical conductivity may deteriorate. Further, PTLs 1 and 2 do not refer to the crystal grain size of the skeleton forming into the three-dimensional network structure. In a case where the crystal grain size thereof is small, thermal conductivity and electrical conductivity deteriorate.

In addition, PTL 1 discloses an example using an uneven metal body made of stainless steel. However, PTL 1 does not disclose conditions of the oxidation treatment and the reduction treatment which can refine the surface of an uneven metal body made of copper or a copper alloy.

The present invention has been made in consideration of the above-described circumstances, and an objective thereof is to provide a porous copper body which is particularly excellent in thermal conductivity and electrical conductivity, a porous copper composite part in which the porous copper body is bonded to a main body of the composite part, a method for manufacturing the porous copper body, and method for manufacturing the porous copper composite part.

Solution to Problem

To solve the above-described problem and to accomplish the above-described objective, a porous copper body according to an aspect of the present invention (hereinafter, referred to as "porous copper body of the present invention") includes a skeleton having a three-dimensional network structure, in which an oxidation-reduction layer formed by an oxidation-reduction treatment is provided on a surface of the skeleton, and the average crystal grain size of an entirety including the skeleton and the oxidation-reduction layer is 5% or more of the diameter of the skeleton.

According to the porous copper body having such configuration, since the porous copper body includes the oxidation-reduction layer formed by the oxidation-reduction treatment on the surface of the skeleton, the specific surface area increases. Therefore, for example, it is possible to greatly improve heat exchange efficiency via the surface of the porous skeleton and the like.

Since the average crystal grain size of an entirety including the skeleton and the oxidation-reduction layer is 5% or more of the diameter of the skeleton, the crystal grain size is relatively large, the amount of crystal grain boundaries in the skeleton and the oxidation-reduction layer is small, and the thermal conductivity and electrical conductivity are excellent.

In the porous copper body of the present invention, it is preferable that the skeleton be constituted by a sintered body made of a plurality of copper fibers.

In this case, voids are sufficiently retained between the copper fibers, a shrinkage ratio in the sintering can be limited, and thus the porosity can be made relatively high.

In the porous copper body of the present invention, it is preferable that in each of the copper fibers, a diameter R be set to be in a range of 0.02 mm to 1.0 mm, and a ratio L/R of a length L to the diameter R be set to be in a range of 4 to 2500.

In this case, the copper fibers in which the diameter R is set to be in a range of 0.02 mm to 1.0 mm, and the ratio L/R of the length L to the diameter R is set to be in a range of 4 to 2500, are sintered. Therefore, voids are sufficiently retained between the copper fibers, and a shrinkage ratio in the sintering can be limited. Accordingly, it is possible to raise the porosity, and dimensional accuracy is excellent.

A porous copper composite part according to another aspect of the present invention (hereinafter, referred to as "porous copper composite part of the present invention") includes: a main body of the composite part; and the above-described porous copper body bonded to the main body of the composite part.

According to the porous copper composite part having such configuration, the porous copper body having a relatively large specific surface area, excellent thermal conductivity, and excellent electrical conductivity is strongly bonded to the main body of the composite part. Therefore, as the porous copper composite part, various excellent properties such as the heat transfer properties and the electrical conductivity are exhibited in addition to the properties of the porous copper body itself which is excellent in heat exchange efficiency via the surface of the porous skeleton and the like.

In the porous copper composite part of the present invention, it is preferable that a bonding surface of the main body of the composite part, to which the porous copper body is bonded, be made of copper or a copper alloy, and the porous copper body and the main body of the composite part be bonded to each other through sintering.

In this case, the porous copper body and the main body of the composite part are integrally bonded to each other through the sintering, and thus the porous copper body and the main body of the composite part are strongly bonded to each other. Therefore, as the porous copper composite part, various excellent properties such as the strength, the heat transfer properties, and the electrical conductivity are exhibited.

A method for manufacturing a porous copper body according to still another aspect of the present invention (hereinafter, referred to as "method for manufacturing a porous copper body of the present invention") is a method for manufacturing the above-described porous copper body which includes: an oxidation-reduction treatment step of subjecting the skeleton to the oxidation-reduction treatment to form the oxidation-reduction layer; and a recrystallization step of recrystallizing the skeleton and the oxidation-reduction layer.

According to the method for manufacturing the porous copper body having such configuration, the method includes: the oxidation-reduction treatment step of subjecting the skeleton to the oxidation-reduction treatment to form the oxidation-reduction layer; and a recrystallization step of recrystallizing the skeleton and the oxidation-reduction layer. Therefore, the crystal grains in the skeleton and the oxidation-reduction layer can be coarsened in the recrystallization step, and thus it is possible to manufacture the porous copper body having excellent thermal conductivity and electrical conductivity.

In the method for manufacturing the porous copper body of the present invention, the skeleton may be formed by sintering a copper raw material.

In this case, by sintering the copper raw material, the skeleton having the three-dimensional network structure can be formed, and thus the porous copper body formed from the sintered body can be obtained.

In the method for manufacturing the porous copper body of the present invention, it is preferable that prior to the oxidation-reduction treatment, the skeleton be subjected to a homogenization treatment.

In this case, by subjecting the skeleton to the homogenization treatment prior to the oxidation-reduction treatment, the crystal grains in the skeleton can be preliminarily coarsened. Further, the crystal grains in the oxidation-reduction layer are grown based on the coarsened crystal grains in the skeleton, and thereby the crystal grains in the oxidation-reduction layer can be also coarsened. In a case of sintering the copper raw material to form the skeleton, the homogenization treatment may be performed on the copper raw material forming the skeleton.

A method for manufacturing a porous copper composite part according to still another aspect of the present invention (hereinafter, referred to as "method for manufacturing a porous copper composite part of the present invention") is a method for manufacturing a porous copper composite part in which includes: a main body of the composite part; and a porous copper body bonded to the main body of the composite part. The method includes a bonding step of bonding the porous copper body manufactured by the above-described method for manufacturing the porous copper body, and the main body of the composite part to each other.

According to the method for manufacturing a porous copper composite part having such configuration, a porous copper body with high porosity and excellent strength equivalent to the porous copper body manufactured by the above-described method for manufacturing the porous copper body is provided, and thus it is possible to manufacture a porous copper composite part having various excellent properties such as the heat transfer properties and the electrical conductivity.

In the method for manufacturing a porous copper composite part of the present invention, it is preferable that, a bonding surface of the main body of the composite part, to which the porous copper body is bonded, be made of copper or a copper alloy, and the porous copper body and the main body of the composite part be bonded to each other through sintering.

In this case, the main body of the composite part and the porous copper body can be integrated with each other through the sintering, and thus it is possible to manufacture a porous copper composite part having various excellent properties such as the heat transfer properties and the electrical conductivity.

Advantageous Effects of Invention

According to the present invention, it is possible to provide a porous copper body which is particularly excellent in thermal conductivity and electrical conductivity, a porous copper composite part in which the porous copper body is bonded to a main body of the composite part, a method for manufacturing the porous copper body, and method for manufacturing the porous copper composite part.

DESCRIPTION OF EMBODIMENTS

Hereinafter, a porous copper body, a porous copper composite part, a method for manufacturing the porous copper body, and a method for manufacturing the porous copper composite part according to embodiments of the present invention will be described with reference to the accompanying drawings.

First Embodiment

First, a porous copper body 10 according to a first embodiment of the present invention will be described with reference to FIG. 1 to FIG. 4.

Figure 1:
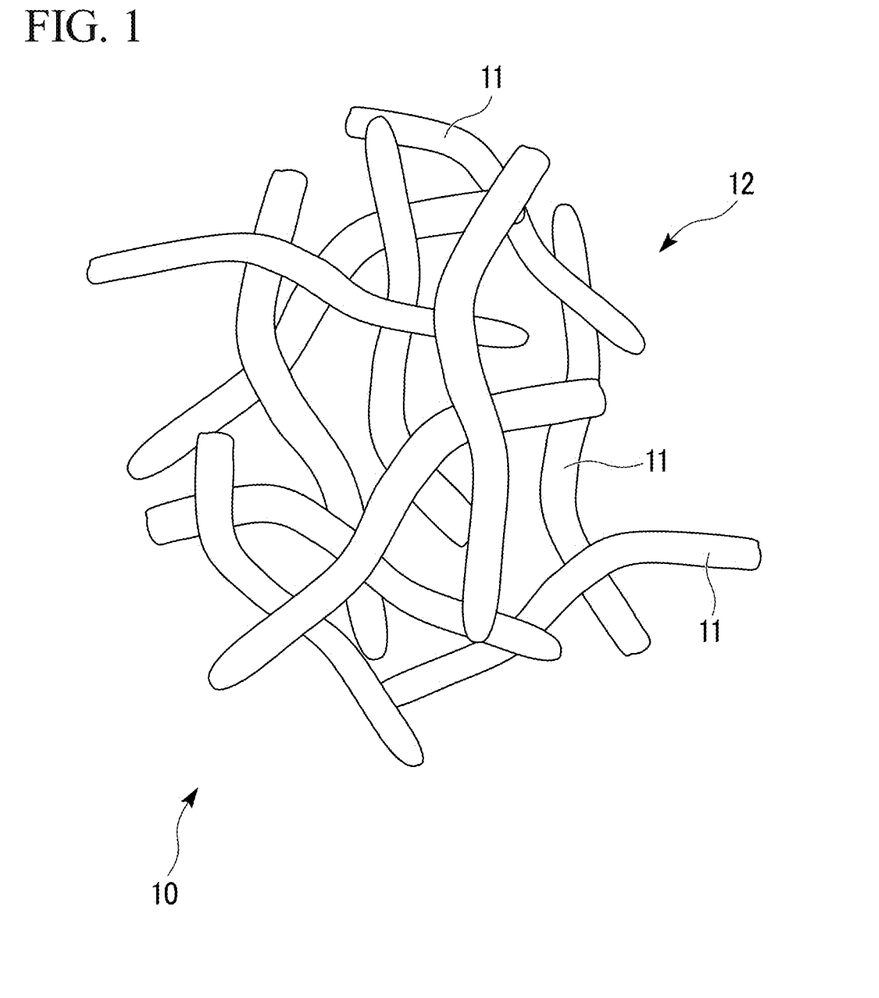
FIG. 1 is an enlarged schematic view of a porous copper body according to a first embodiment of the present invention.

As shown in FIG. 1, the porous copper body 10 according to this embodiment includes a skeleton 12 formed by sintering a plurality of copper fibers 11.

Each of the copper fibers 11 is made of copper or a copper alloy, and has a diameter R set to be in a range of 0.02 mm to 1.0 mm and a ratio L/R of a length L to the diameter R set to be in a range of 4 to 2500. In this embodiment, for example, each of the copper fibers 11 is made of C1100 (tough pitch copper).

In this embodiment, the copper fibers 11 are subjected to shape imparting such as twisting and bending.

In the porous copper body 10 according to this embodiment, an apparent density $D_A$ is set to be 51% or less of a true density $D_T$ of the copper fibers 11. The shape of each copper fiber 11 is an arbitrary shape, such as a linear shape and a curved shape, as long as the apparent density $D_A$ is 51% or less of the true density $D_T$ of the copper fibers 11. However, when using the copper fibers 11 in which at least a part thereof is subjected to a processing for imparting a predetermined shape such as twisting and bending, it is possible to form voids between fibers in a three-dimensional and isotropic shape. As a result, it is possible to improve the isotropy of various properties such as the heat transfer properties and the electrical conductivity of the porous copper body 10.

In the porous copper body 10 according to this embodiment, an oxidation-reduction layer is formed on a surface of the skeleton 12 (copper fibers 11). In bonding portions between the copper fibers 11, oxidation-reduction layers formed on surfaces of the copper fibers 11 are integrally bonded to each other.

Each of the oxidation-reduction layers has a porous structure, and causes minute unevenness on the surface of skeleton 12 (copper fibers 11). According to this, a specific surface area of the entirety of the porous copper body 10 is set to be 0.01 m²/g or greater, and a porosity thereof is set to be in a range of 50% to 90%.

Although not particularly limited, the upper limit of the specific surface area of the entirety of the porous copper body 10 is 0.50 m²/g.

Although not particularly limited, a range of the specific surface area of the entirety of the porous copper body 10 is preferably 0.03 m²/g to 0.40 m²/g, and more preferably 0.05 m²/g to 0.30 m²/g. Similarly, although not particularly limited, the range of the porosity is 60% to 90%, and more preferably 70% to 90%.

Figures 2, 3:
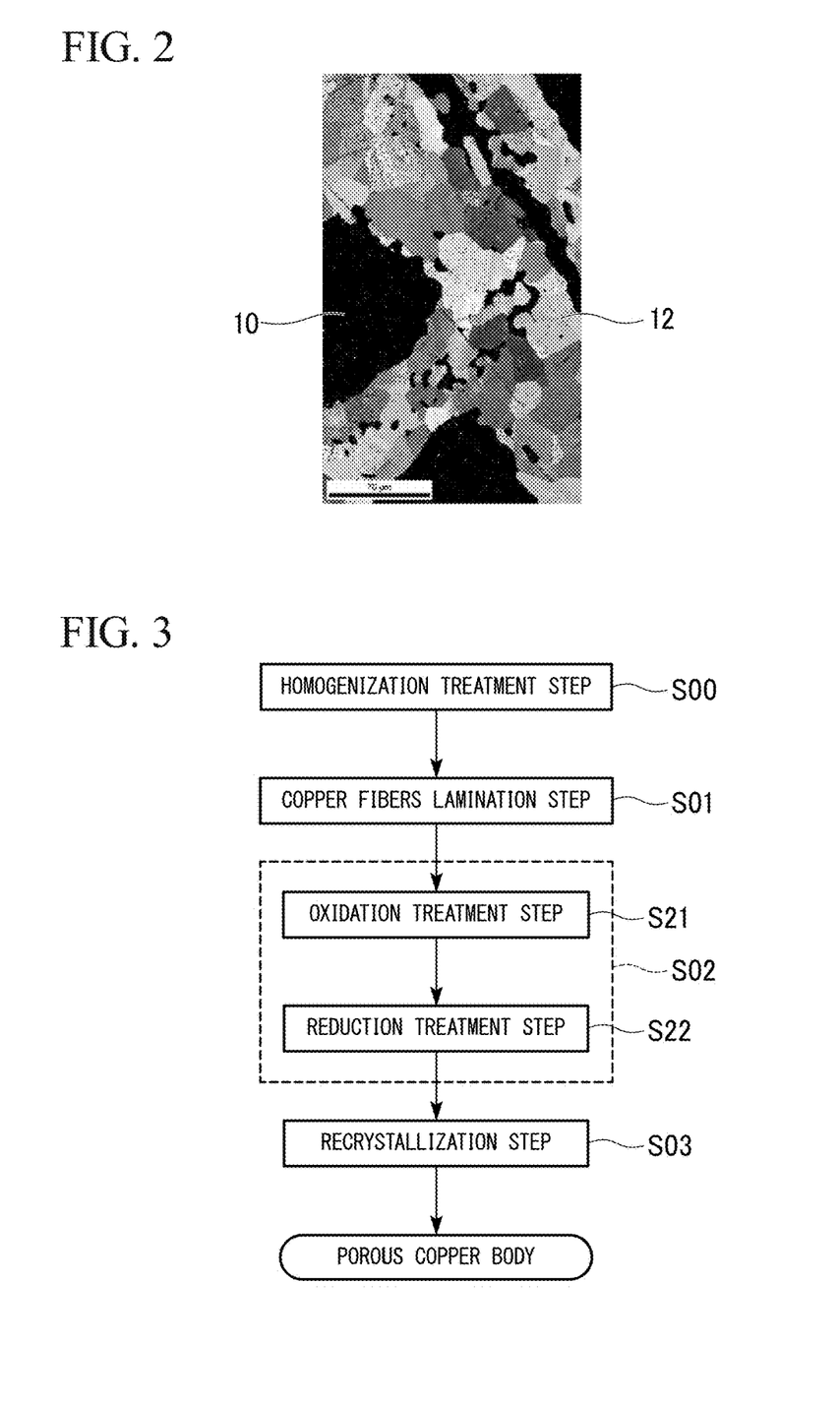
FIG. 2 is a partially enlarged observation image of the porous copper body shown in FIG. 1.
FIG. 3 is a flowchart showing an example of a method for manufacturing the porous copper body shown in FIG. 1.

In the porous copper body 10 according to this embodiment, as shown in FIG. 2, crystal grains in the skeleton 12 and the oxidation-reduction layer are coarsened, and an average crystal grain size of an entirety of the porous copper body 10 including the skeleton 12 and the oxidation-reduction layer is 5% or more of the diameter of the skeleton 12. In this manner, by coarsening the crystal grains, the amount of crystal grain boundaries present in the entirety of the porous copper body 10 including the skeleton 12 and the oxidation-reduction layer is decreased. In this embodiment, the average crystal grain size of an entirety including the skeleton 12 and the oxidation-reduction layer is set to be in a range of 5% to 300% of the diameter of the skeleton 12.

Next, a method for manufacturing the porous copper body 10 according to this embodiment will be described with reference to a flowchart in FIG. 3, a process diagram of FIG. 4, and the like.

First, copper fibers 11 as a raw material are subjected to homogenization treatment (homogenization treatment step S00).

In the homogenization treatment step S00 in this embodiment, heat treatment is performed in an inert atmosphere (such as argon and nitrogen) at 300° C. to 1080° C. for 5 minutes to 24 hours, and then cooled in a furnace.

In a case where the holding temperature in the homogenization treatment step S00 is lower than 300° C., the crystal grains are difficult to be coarsened. In a case where it is higher than 1080° C., there is a concern that recrystallization may completely proceed and thus the crystal grains cannot be further coarsened.

From the above, in this embodiment, the holding temperature in the homogenization treatment step S00 is set to be in a range of 300° C. to 1080° C. It is preferable to set the lower limit of the holding temperature in the homogenization treatment step S00 to be 500° C. and the upper limit thereof to 1000° C. in order to surely coarsen the crystal grains in the copper fibers 11.

In a case where the holding time in the homogenization treatment step S00 is shorter than 5 minutes, there is a concern that the recrystallization may not be sufficiently conducted. In a case where it is longer than 24 hours, there is a concern that recrystallization may completely proceed and thus the crystal grains cannot be further coarsened.

From the above, in this embodiment, the holding time in the homogenization treatment step S00 is set to be 5 minutes to 24 hours. It is preferable to set the lower limit of the holding time in the homogenization treatment step S00 to be 30 minutes and the upper limit thereof to 18 hours in order to surely coarsen the crystal grains in the copper fibers 11.

Figure 4:
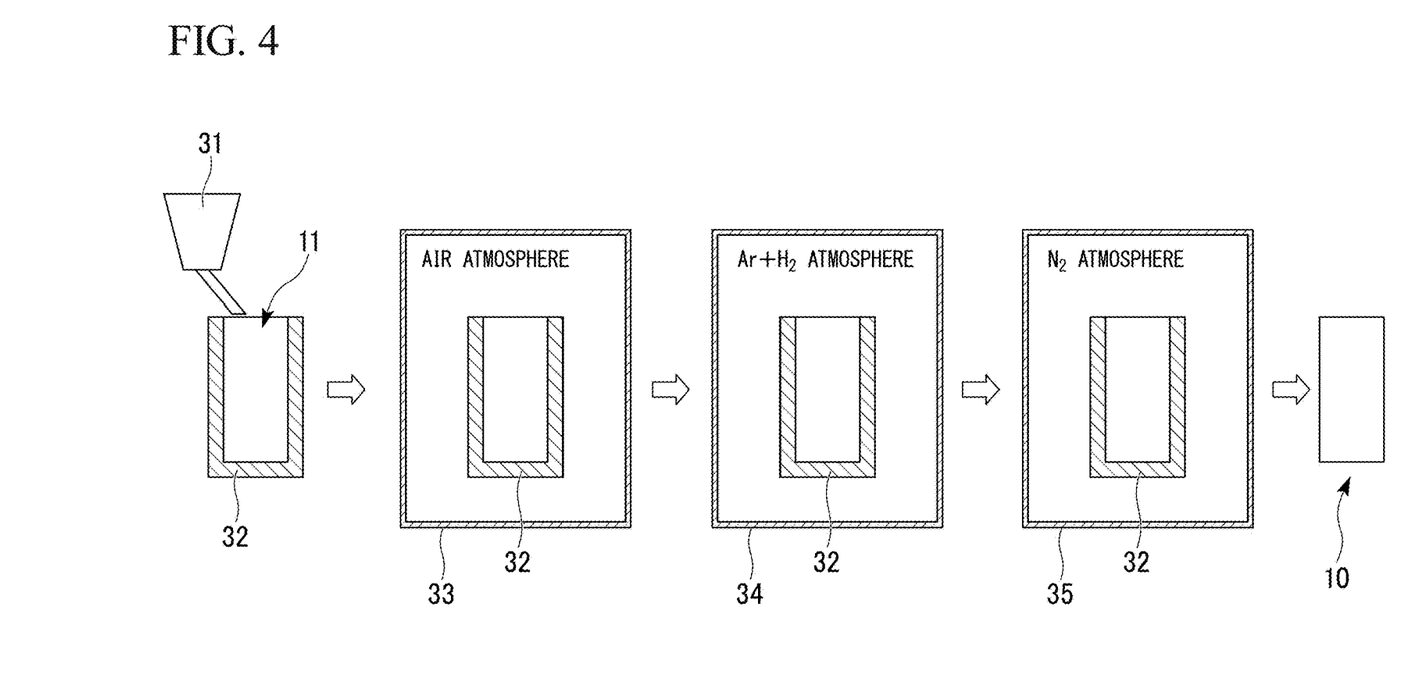
FIG. 4 is a view showing a manufacturing process of manufacturing the porous copper body shown in FIG. 1.

Next, as shown in FIG. 4, the copper fibers 11 after the homogenization treatment step are distributed from a distributor 31 toward the inside of a stainless-steel container 32 to bulk-fill the stainless-steel container 32. Thereby, the copper fibers 11 are laminated (copper fibers lamination step S01).

In the copper fibers lamination step S01, a plurality of the copper fibers 11 are laminated so that a bulk density $D_P$ after the filling becomes 50% or less of the true density $D_T$ of the copper fibers 11. In this embodiment, the copper fibers 11 are subjected to a processing for imparting a shape such as twisting and bending, and thus it is possible to retain three-dimensional and isotropic voids between the copper fibers 11 during lamination.

Next, the copper fibers 11 bulk-filling the stainless-steel container 32 are subjected to an oxidation-reduction treatment (oxidation-reduction treatment step S02).

As shown in FIG. 3 and FIG. 4, the oxidation-reduction treatment step S02 includes: an oxidation treatment step S21 of performing an oxidation treatment on the copper fibers 11, and a reduction treatment step S22 of reducing and sintering the copper fibers 11 subjected to the oxidation treatment.

In this embodiment, as shown in FIG. 4, the stainless-steel container 32 filled with the copper fibers 11 is put in a heating furnace 33 and heated in an air atmosphere to perform an oxidation treatment on the copper fibers 11 (oxidation treatment step S21). Through the oxidation treatment step S21, an oxide layer, for example, with a thickness of 1 μm to 100 μm is formed on a surface of each of the copper fibers 11.

Conditions of the oxidation treatment step S21 in this embodiment are set such that the holding temperature is in a range of 520° C. to 900° C. and the holding time is in a range of 5 minutes to 300 minutes.

In a case where the holding temperature in the oxidation treatment step S21 is lower than 520° C., there is a concern that the oxide layers are not sufficiently formed on the surfaces of the copper fibers 11. On the other hand, in a case where the holding temperature in the oxidation treatment step S21 is higher than 900° C., there is a concern that oxidation may progress to the inside of the copper fibers 11 and thus the crystal grains may not be coarsened.

From the above, in this embodiment, the holding temperature in the oxidation treatment step S21 is set to be 520° C. to 900° C. In the oxidation treatment step S21, it is preferable that the lower limit of the holding temperature be set to be 600° C., and the upper limit of the holding temperature be set to be 850° C. in order to surely form the oxide layers on the surfaces of the copper fibers 11.

In a case where the holding time in the oxidation treatment step S21 is shorter than 5 minutes, there is a concern that the oxide layers may not be sufficiently formed on the surfaces of the copper fibers 11. On the other hand, in a case where the holding time in the oxidation treatment step S21 is longer than 300 minutes, there is a concern that oxidation may progress to the inside of the copper fibers 11 and thus the crystal grains may not be sufficiently coarsened.

From the above, in this embodiment, the holding time in the oxidation treatment step S21 is set to be in a range of 5 minutes to 300 minutes. It is preferable that the lower limit of the holding time in the oxidation treatment step S21 be set to be 10 minutes in order to surely form the oxide layers on the surfaces of the copper fibers 11. It is preferable that the upper limit of the holding time in the oxidation treatment step S21 be set to be 100 minutes in order to surely suppress oxidation on the inside of the copper fibers 11.

Next, in this embodiment, as shown in FIG. 4, after performing the oxidation treatment step S21, the stainless steel container 32 filled with the copper fibers 11 is put in the heating furnace 34 and is heated in a reduction atmosphere. According to this, the oxidized copper fibers 11 are subjected to a reduction treatment to form an oxidation-reduction layer, and the copper fibers 11 are bonded to each other to form the skeleton 12 (reduction treatment step S22).

Conditions of the reduction treatment step S22 in this embodiment are set such that the atmosphere is a mixed gas atmosphere of argon and hydrogen, the holding temperature is in a range of 600° C. to 1080° C., and the holding time is in a range of 5 minutes to 300 minutes.

In a case where the holding temperature in the reduction treatment step S22 is lower than 600° C., there is a concern that the oxide layers formed on the surfaces of the copper fibers 11 may not be sufficiently reduced. On the other hand, in a case where the holding temperature in the reduction treatment step S22 is higher than 1080° C., the copper fibers are heated to near the melting point of copper, and thus there is a concern that the specific surface area and porosity may decrease.

From the above, in this embodiment, the holding temperature in the reduction treatment step S22 is set to be 600° C. to 1080° C. It is preferable that the lower limit of the holding temperature in the reduction treatment step S22 be set to be 650° C. in order to surely reduce the oxide layers formed on the surfaces of the copper fibers 11. It is preferable that the upper limit of the holding temperature in the reduction treatment step S22 be set to be 1050° C. in order to surely limit a decrease in the specific surface area and the porosity.

In a case where the holding time in the reduction treatment step S22 is shorter than 5 minutes, there is a concern that the oxide layers formed on the surfaces of the copper fibers 11 may not be sufficiently reduced and sintering may become insufficient. On the other hand, in a case where the holding time in the reduction treatment step S22 is longer than 300 minutes, there is a concern that thermal shrinkage due to the sintering may increase and the specific surface area and the porosity may decrease.

From the above, in this embodiment, the holding time in the reduction treatment step S22 is set to be in a range of 5 minutes to 300 minutes. It is preferable that the lower limit of the holding time in the reduction treatment step S22 be set to be 10 minutes in order to surely reduce the oxide layers formed on the surfaces of the copper fibers 11 and to allow sintering to sufficiently progress. It is preferable that the upper limit of the holding time in the reduction treatment step S22 be set to be 100 minutes in order to surely limit thermal shrinkage due to the sintering or a decrease in the specific surface area and the porosity.

An oxidation-reduction layer is formed on the surface of the copper fibers 11 (skeleton 12) by the oxidation treatment step S21 and the reduction treatment step S22 and thus minute unevenness is formed.

The oxide layers are formed on the surfaces of the copper fibers 11 by the oxidation treatment step S21, and a plurality of the copper fibers 11 are cross-linked through the oxide layers. Then, by performing the reduction treatment step S22, the oxide layers formed on the surfaces of the copper fibers 11 are reduced so as to form the above-described oxidation-reduction layers. In addition, the oxidation-reduction layers are bonded to each other and thereby the copper fibers 11 are sintered so as to form the skeleton 12.

After performing the oxidation-reduction treatment step S02 to form the skeleton 12 and the oxidation-reduction layer, the stainless steel container 32 filled with the copper fibers 11 is put in the heating furnace 35 to perform recrystallization of the skeleton 12 and the oxidation-reduction layer (recrystallization step S03).

Conditions of the recrystallization step S03 in this embodiment are set such that the atmosphere is a reduction atmosphere or an inert gas atmosphere ($N_2$ atmosphere in this embodiment), the holding temperature is in a range of 300° C. to 1080° C., and the holding time is in a range of 5 minutes to 24 hours.

By the recrystallization step S03, the crystal grains in the skeleton 12 and the oxidation-reduction layer are coarsened and thus the average crystal grain size of an entirety including the skeleton 12 and the oxidation-reduction layer is set to be 5% or more of the diameter of the skeleton 12.

In a case where the holding temperature in the recrystallization step S03 is lower than 300° C., there is a concern that the recrystallization may not be sufficiently conducted. On the other hand, in a case where the holding temperature in the recrystallization step S03 is higher than 1080° C., recrystallization completely proceeds and thus the crystal grains cannot be further coarsened. In addition, the skeleton and the oxidation-reduction layer are heated to near the melting point of copper, and thus there is a concern that the shape thereof cannot be maintained and the specific surface area and the porosity may decrease.

From the above, in this embodiment, the holding temperature in the recrystallization step S03 is set to be 300° C. to 1080° C.

In a case where the holding time in the recrystallization step S03 is shorter than 5 minutes, there is a concern that the recrystallization may not be sufficiently conducted. On the other hand, in a case where the holding time in the recrystallization step S03 is longer than 24 hours, there is a concern that thermal shrinkage due to the sintering may increase, and the shape cannot be maintain, and thus the specific surface area and the porosity may decrease.

From the above, in this embodiment, the holding time in the recrystallization step S03 is set to be in a range of 5 minutes to 24 hours.

In order to maintain the unevenness formed by the oxidation-reduction layer and retain a large specific surface area, conditions with low temperature and long time, or conditions with high temperature and short time are preferable. Specifically, product T×H of the holding temperature T (° C.) and the holding time H (minutes) in the recrystallization step S03 is preferably 1,000,000 or less, and more preferably 600,000 or less. Furthermore, in order to surely recrystallize the skeleton 12 and the oxidation-reduction layer, (T−300)×H is preferably 5,000 or more and further preferably 10,000 or more.

According to the manufacturing method as described above, the copper fibers 11 are sintered so as to form the skeleton 12, and the oxidation-reduction layer is formed on the surface of the skeleton 12 (copper fibers 11). Then, by coarsening the crystal grains in the skeleton 12 and the oxidation-reduction layer through the recrystallization step S03, the porous copper body 10 according to this embodiment is manufactured.

According to the porous copper body 10 of this embodiment described above, the average crystal grain size of an entirety including the skeleton 12 and the oxidation-reduction layer is set to be 5% or more of the diameter of the skeleton 12, and in this embodiment, set to be in a range of 5% to 300% of the diameter of the skeleton 12. Therefore, the crystal grain size is relatively large, the amount of crystal grain boundaries is small, and the thermal conductivity and electrical conductivity are excellent.

In the porous copper body 10 according to this embodiment, the skeleton 12 is formed by sintering the copper fibers 11 in which the diameter R is set to be in a range of 0.02 mm to 1.0 mm, and the ratio L/R of the length L to the diameter R is set to be in a range of 4 to 2500. Therefore, voids are sufficiently retained between the copper fibers 11, and it is possible to limit the shrinkage ratio in the sintering. As a result, the porosity is high and the dimensional accuracy is excellent.

This embodiment includes the copper fibers lamination step S01 in which the copper fibers 11 having the diameter R in a range of 0.02 mm to 1.0 mm and the ratio L/R of the length L to the diameter R in a range of 4 to 2500 are laminated so that the bulk density $D_P$ is 50% or less of the true density $D_T$ of the copper fibers 11. Therefore, it is possible to retain voids between the copper fibers 11 and limit shrinkage. According to this, it is possible to manufacture the porous copper body 10 with high porosity and excellent dimensional accuracy.

Specifically, the apparent density $D_A$ of the porous copper body 10 which is manufactured by sintering the copper fibers 11 laminated so that the bulk density $D_P$ is 50% or less of the true density $D_T$ of the copper fibers 11, is set to be 51% or less of the true density $D_T$ of the copper fibers 11. Therefore, shrinkage during the sintering is limited, and thus a high porosity can be retained.

In a case where the diameter R of the copper fibers 11 is less than 0.02 mm, there is a concern that a bonding area between the copper fibers 11 may be small and thus sintering strength may be deficient. On the other hand, in a case where the diameter R of the copper fibers 11 is greater than 1.0 mm, there is a concern that the number of contact points at which the copper fibers 11 come into contact with each other may be deficient and thus the sintering strength may be deficient.

From the above, in this embodiment, the diameter R of the copper fibers 11 is set to be in a range of 0.02 mm to 1.0 mm. It is preferable that the lower limit of the diameter R of the copper fibers 11 be set to be 0.05 mm, and the upper limit of the diameter R of the copper fibers 11 be set to be 0.5 mm in order to further improve strength.

In a case where the ratio L/R of the length L to the diameter R of the copper fibers 11 is less than 4, it is difficult for the bulk density $D_P$ to be 50% or less of the true density $D_T$ of the copper fibers 11 when laminating the copper fibers 11, and thus there is a concern that it is difficult to obtain the porous copper body 10 with a high porosity. On the other hand, in a case where the ratio L/R of the length L to the diameter R of the copper fibers 11 is greater than 2500, there is a concern that the copper fibers 11 cannot be uniformly dispersed and thus it is difficult to obtain the porous copper body 10 with a uniform porosity.

From the above, in this embodiment, the ratio L/R of the length L to the diameter R of the copper fibers 11 is set to be in a range of 4 to 2500. It is preferable that the lower limit of the ratio L/R of the length L to the diameter R of the copper fibers 11 be set to be 10 in order to further improve porosity. It is preferable that the upper limit of the ratio L/R of the length L to the diameter R of the copper fibers 11 be set to be 500 in order to surely obtain the porous copper body 10 with a uniform porosity.

The method for manufacturing the porous copper body according to this embodiment includes: the oxidation treatment step S21 of oxidizing the copper fibers 11; and the reduction treatment step S22 of reducing the oxidized copper fibers 11. Therefore, it is possible to form the oxidation-reduction layer on the surface of the copper fibers 11 (skeleton 12).

The method for manufacturing the porous copper body according to this embodiment includes the recrystallization step S03 of performing the recrystallization treatment of the skeleton 12 and the oxidation-reduction layer. Therefore, the crystal grains in the skeleton 12 and the oxidation-reduction layer can be coarsened, and the average crystal grain size of an entirety including the skeleton 12 and the oxidation-reduction layer can be set to be 5% or more of the diameter of the skeleton 12.

In this embodiment, the copper fibers 11 are used as a sintering raw material for forming the skeleton 12. Therefore, the proportion of non-oxidation-reduction region with respect to the oxidation-reduction layer formed on the surface is large, it is possible to prevent the crystal grain size from being too fine.

The method for manufacturing the porous copper body according to this embodiment includes the homogenization treatment step S00 of performing the homogenization treatment of the copper fibers 11 forming the skeleton 12 prior to the oxidation-reduction treatment step S02. Therefore, the crystal grains of the skeleton 12 can be preliminarily coarsened. Further, the crystal grains in the oxidation-reduction layer are grown based on the coarsened crystal grains in the skeleton 12, and thereby the crystal grains in the oxidation-reduction layer can be also coarsened.

Second Embodiment

A porous copper composite part 100 according to a second embodiment of the present invention will be described with reference to the accompanying drawings.

Figure 5:
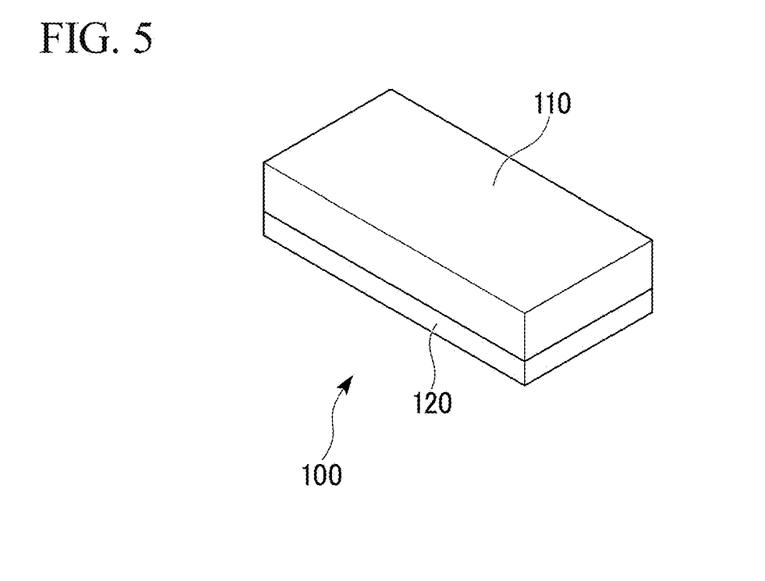
FIG. 5 is a view showing an external appearance of a porous copper composite part according to a second embodiment of the present invention.

FIG. 5 shows the porous copper composite part 100 according to this embodiment. The porous copper composite part 100 includes: a copper plate 120 (main body of the composite part) made of copper or a copper alloy; and a porous copper body 110 bonded to the surface of the copper plate 120.

In the porous copper body 110 according to this embodiment, a plurality of copper fibers are sintered to form a skeleton in the same manner as in the first embodiment. The copper fibers are made of copper or a copper alloy, and have a diameter R set to be in a range of 0.02 mm to 1.0 mm and a ratio L/R of a length L to the diameter R set to be in a range of 4 to 2500. In this embodiment, the copper fibers are made of, for example, C1100 (tough pitch copper).

In this embodiment, the copper fibers are subjected to shape imparting such as twisting and bending. In the porous copper body 110 according to this embodiment, an apparent density $D_A$ thereof is set to be 51% or less of a true density $D_T$ of the copper fibers.

In this embodiment, by performing an oxidation-reduction treatment (an oxidation treatment and a reduction treatment) as described later, an oxidation-reduction layers are formed on the surfaces of the copper fibers (skeleton) constituting the porous copper body 110 and the copper plate 120. Thereby, minute unevenness is formed on the surfaces of copper fibers (skeleton) and the copper plate 120. In this embodiment, the specific surface area of the entirety of the porous copper body 110 is set to be 0.01 m²/g or greater, and the porosity thereof is set to be in a range of 50% to 90%.

Although not particularly limited, the upper limit of the specific surface area of the entirety of the porous copper body 10 is 0.50 m²/g.

Although not particularly limited, the specific surface area of the entirety of the porous copper body 10 is preferably 0.03 m²/g to 0.40 m²/g and more preferably 0.05 m²/g to 0.30 m²/g. Similarly, although not particularly limited, the porosity is preferably 60% to 90%, and more preferably 70% to 90%.

An oxidation-reduction layer formed on the surface of the copper fibers and an oxidation-reduction layer formed on the surface of the copper plate 120 are integrally bonded to each other at bonding portions between the surfaces of the copper fibers constituting the porous copper body 110 and the copper plate 120.

In this embodiment, crystal grains in the skeleton and the oxidation-reduction layer of the porous copper body 110 are coarsened, the average crystal grain size of an entirety including the skeleton and the oxidation-reduction layer can be set to be 5% or more of the diameter of the skeleton. In this manner, by coarsening the crystal grains, the amount of crystal grain boundaries present in the entirety of the porous copper body 110 including the skeleton and the oxidation-reduction layer is decreased. In this embodiment, the average crystal grain size of an entirety of the porous copper body 110 including the skeleton and the oxidation-reduction layer is set to be in a range of 5% to 300% of the diameter of the skeleton.

Figure 6:
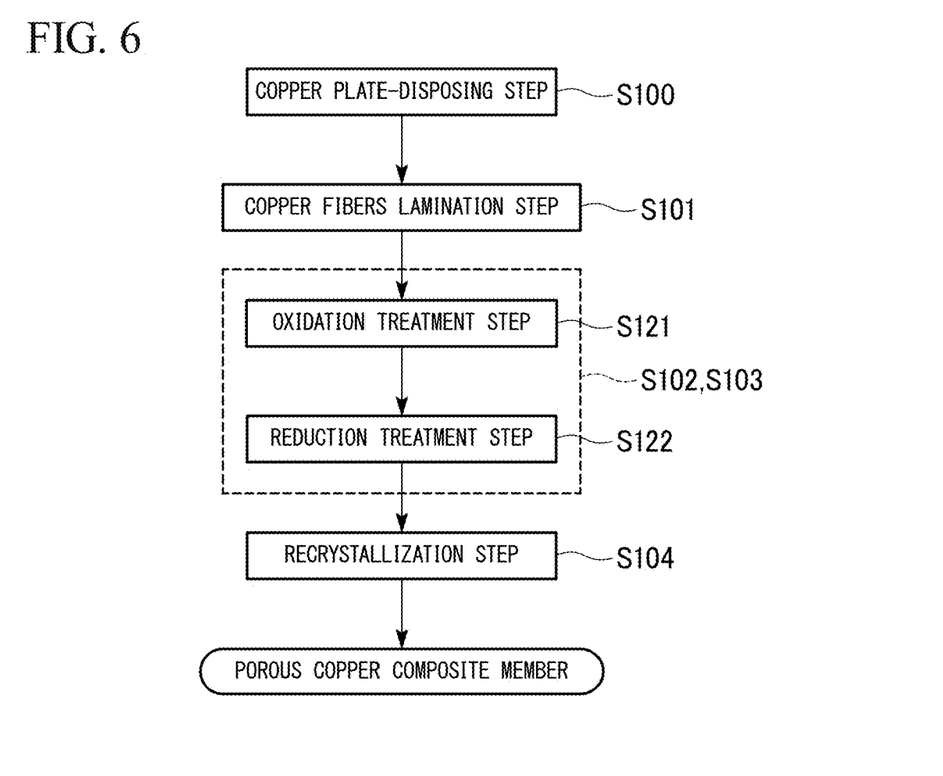
FIG. 6 is a flowchart showing an example of a method for manufacturing the porous copper composite part shown in FIG. 5.

Next, a method for manufacturing the porous copper composite part 100 according to this embodiment will be described with reference to a flowchart in FIG. 6.

First, the copper plate 120 as a main body of the composite part is prepared (copper plate-disposing step S100). Copper fibers are dispersed and laminated on the surface of the copper plate 120 (copper fibers lamination step S101). In the copper fibers lamination step S101, a plurality of the copper fibers are laminated so that a bulk density $D_P$ is 50% or less of a true density $D_T$ of the copper fibers.

Next, the copper fibers laminated on the surface of the copper plate 120 are sintered to shape the porous copper body 110 and to bond the porous copper body 110 and the copper plate 120 to each other (a sintering step S102 and a bonding step S103). As shown in FIG. 6, the sintering step S102 and the bonding step S103 include: an oxidation treatment step S121 of performing an oxidation treatment of the copper fibers and the copper plate 120; and a reduction treatment step S122 of reducing and sintering the copper fibers and the copper plate 120 subjected to the oxidization treatment.

In this embodiment, the copper plate 120 on which the copper fibers are laminated is put in a heating furnace, and is heated in an air atmosphere to perform an oxidization treatment on the copper fibers (oxidation treatment step S121). According to the oxidation treatment step S121, for example, oxide layers with a thickness of 1 μm to 100 μm are formed on the surfaces of the copper fibers and the copper plate 120.

Conditions of the oxidation treatment step S121 in this embodiment are set such that the holding temperature is in a range of 520° C. to 900° C. and preferably 600° C. to 850° C., and the holding time is in a range of 5 minutes to 300 minutes and preferably 10 minutes to 100 minutes.

In this embodiment, after performing the oxidation treatment step S121, the copper plate 120 on which the copper fibers are laminated is put in a sintering furnace, and is heated in a reduction atmosphere to perform a reduction treatment on the oxidized copper fibers and the oxidized copper plate 120. Thereby, the copper fibers are bonded to each other and the copper fibers and the copper plate 120 are bonded to each other (reduction treatment step S122).

Conditions of the reduction treatment step S122 in this embodiment are set such that the atmosphere is a mixed gas atmosphere of nitrogen and hydrogen, the holding temperature is in a range of 600° C. to 1080° C. and preferably 650° C. to 1050° C., and the holding time is in a range of 5 minutes to 300 minutes and preferably 10 minutes to 100 minutes.

By the oxidation treatment step S121 and the reduction treatment step S122, an oxidation-reduction layer is formed on the surfaces of the copper fibers (skeleton) and the copper plate 120 and minute unevenness is formed.

Oxide layers are formed on the surfaces of the copper fibers (skeleton) and the copper plate 120 by the oxidation treatment step S121. Through the oxide layers, a plurality of the copper fibers are cross-linked to each other and to the copper plate 120. Then, by performing the reduction treatment S122, the oxide layers formed on the surfaces of the copper fibers (skeleton) and the copper plate 120 are reduced. Thereby, the copper fibers are sintered through the oxidation-reduction layer to form the skeleton, and the copper fibers and the copper plate 120 are bonded to each other.

Next, the recrystallization treatment for coarsening the crystal grains of the skeleton and the oxidation-reduction layer is performed (recrystallization step S104).

Conditions of the recrystallization step S104 in this embodiment are set such that the atmosphere is a reduction atmosphere or an inert gas atmosphere, the holding temperature is in a range of 300° C. to 1080° C., and the holding time is in a range of 5 minutes to 24 hours. Through this recrystallization step S104, the crystal grains in the skeleton and the oxidation-reduction layer are coarsened, and thus the average crystal grain size of an entirety including the skeleton and the oxidation-reduction layer is set to be 5% or more of the diameter of the skeleton.

According to the manufacturing method as described above, the porous copper composite part 100 according to this embodiment is manufactured.

In the porous copper composite part 100 of this embodiment described above, the average crystal grain size of an entirety of the porous copper body 110 including the skeleton and the oxidation-reduction layer is set to be 5% or more of the diameter of the skeleton. Therefore, the crystal grain size is relatively large, the amount of crystal grain boundaries is small in the skeleton and the oxidation-reduction layer, and the thermal conductivity and electrical conductivity are excellent.

In the porous copper composite part 100 according to this embodiment, the porous copper body 110 is obtained through sintering of the copper fibers having the diameter R set to be in a range of 0.02 mm to 1.0 mm and the ratio L/R of the length L to the diameter R set to be in a range of 4 to 2500, and thus has a high porosity and excellent strength and dimensional accuracy. This porous copper body 110 is bonded to the surface of the copper plate 120. Therefore, various properties thereof, such as the heat transfer properties and the electrical conductivity, are excellent.

In this embodiment, the oxidation-reduction layer is formed on the surfaces of the copper fibers constituting the porous copper body 110 and the copper plate 120, the specific surface area of the entirety of the porous copper body 110 is set to be 0.01 $m^2/g$ or greater, and the porosity thereof is set to be in a range of 50% to 90%. Therefore, it is possible to greatly improve heat exchange efficiency via the surface of the porous skeleton and the like.

In this embodiment, an oxidation-reduction layer formed on the surface of the copper fibers and an oxidation-reduction layer formed on the surface of the copper plate 120 are integrally bonded to each other at bonding portions between the surfaces of the copper fibers constituting the porous copper body 110 and the copper plate 120. Therefore, the porous copper body 110 and the copper plate 120 are strongly bonded to each other, and thus various properties thereof, such as the strength of a bonding interface, the heat transfer properties, and the electrical conductivity, are excellent.

The method for manufacturing the porous copper composite part 100 of this embodiment includes the recrystallization step S104 of performing the recrystallization treatment of the skeleton and the oxidation-reduction layer. Therefore, the crystal grains in the skeleton and the oxidation-reduction layer can be coarsened, and thus the average crystal grain size of an entirety including the skeleton and the oxidation-reduction layer can be set to be 5% or more of the diameter of the skeleton.

In the method for manufacturing the porous copper composite part 100 according to this embodiment, the copper fibers are laminated on the surface of the copper plate 120 made of copper or a copper alloy, and the sintering step S102 and the bonding step S103 are simultaneously performed. Therefore, it is possible to simplify the manufacturing process.

Hereinbefore, the embodiments of the present invention were described. However, the present invention is not limited thereto and can be appropriately modified in a range not departing from the technical idea of the invention.

For example, although the embodiments are described such that the porous copper body is manufactured using a manufacturing facility shown in FIG. 4, there is no limitation thereto and the porous copper body can be manufactured using another manufacturing facility.

The atmosphere of the oxidation treatment steps S21 and S121 has only to be an oxidation atmosphere in which copper or a copper alloy is oxidized at a predetermined temperature. Specifically, the atmosphere is not limited to the air atmosphere, and has only to be an atmosphere in which 10 vol % or greater of oxygen is contained in an inert gas (for example, nitrogen or argon). The atmosphere of the reduction treatment steps S22 and S122 has only to be a reduction atmosphere in which a copper oxide is reduced into metal copper or the copper oxide is decomposed at a predetermined temperature. Specifically, it is possible to suitably use a nitrogen-hydrogen mixed gas or an argon-hydrogen mixed gas which contains several vol % or greater of hydrogen, a pure hydrogen gas, or an ammonia decomposed gas or a propane decomposed gas which is industrially used in many cases, and the like.

Although the embodiments are described such that the skeleton of the porous copper body is formed by sintering the copper fibers, there is no limitation thereto and a porous copper body such as fiber non-woven fabric and a metal filter may be prepared and subjected to the oxidation-reduction treatment and the recrystallization treatment. In addition, the porous copper body such as fiber non-woven fabric and a metal filter may be subjected to the homogenization treatment prior to the oxidation-reduction treatment.

In addition, although the embodiments are described such that copper fibers made of tough pitch copper (JIS C1100) or oxygen-free copper (JIS C1020) are used, there is no limitation thereto and as a material of the copper fibers 11, it is possible to suitably use phosphorus deoxidized copper (JIS C1201, C1220), silver-containing copper (for example, Cu-0.02 to 0.5 mass % of Ag), chromium copper (for example, Cu-0.02 to 1.0 mass % of Cr), zirconium copper (for example, Cu-0.02 to 1.0 mass % of Zr), tin-containing copper (for example, Cu-0.1 to 1.0 mass % of Sn), and the like. Particularly, in a case of being used in a high-temperature environment of 200° C. or higher, it is preferable to use the silver-containing copper, the chromium copper, the tin-containing copper, the zirconium copper and the like, which are excellent in high-temperature strength.

In the second embodiment, although the porous copper composite part having a structure shown in FIG. 5 is described as an example, there is no limitation thereto and a porous copper composite part having a structure as shown in FIG. 7 to FIG. 12 may be employed.

Figure 7:
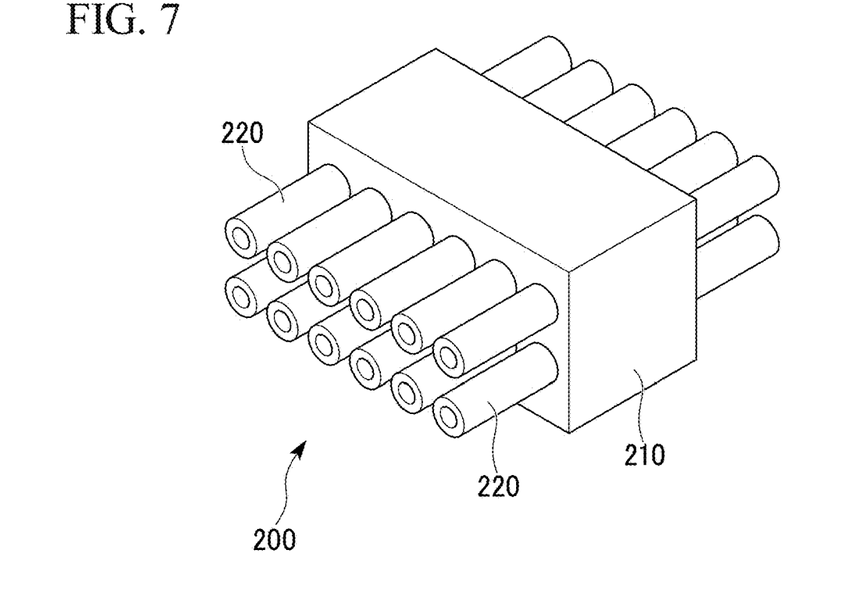
FIG. 7 is an external view of a porous copper composite part according to still another embodiment of the present invention.

For example, as shown in FIG. 7, a porous copper composite part 200 in which a plurality of copper tubes 220 as a main body of the composite part are inserted into a porous copper body 210, may be employed.

Figure 8:
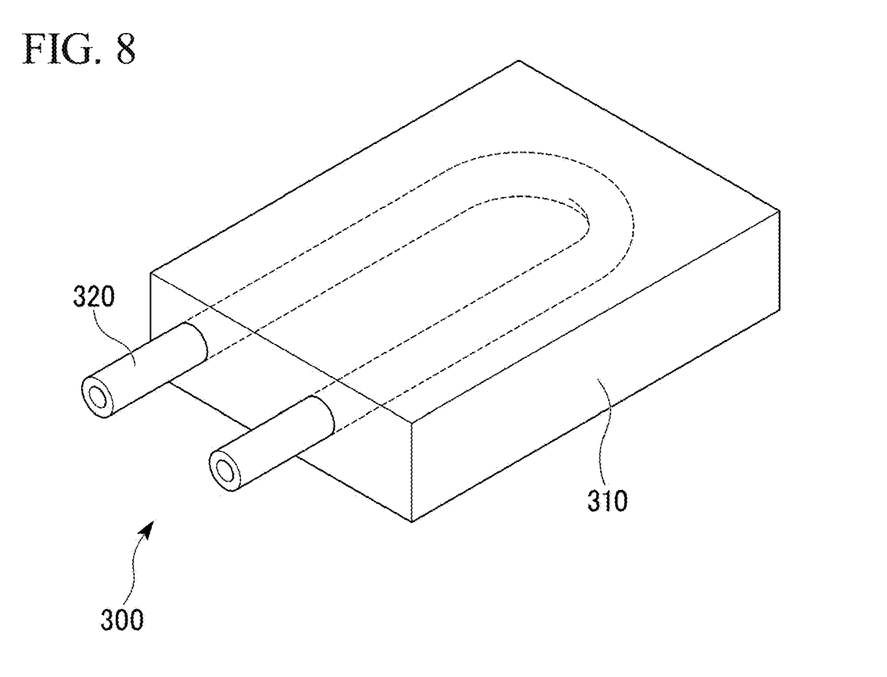
FIG. 8 is an external view of a porous copper composite part according to still another embodiment of the present invention.

Alternatively, as shown in FIG. 8, a porous copper composite part 300 in which a copper tube 320 as a main body of the composite part curved in a U-shape is inserted into a porous copper body 310, may be employed.

Figure 9:
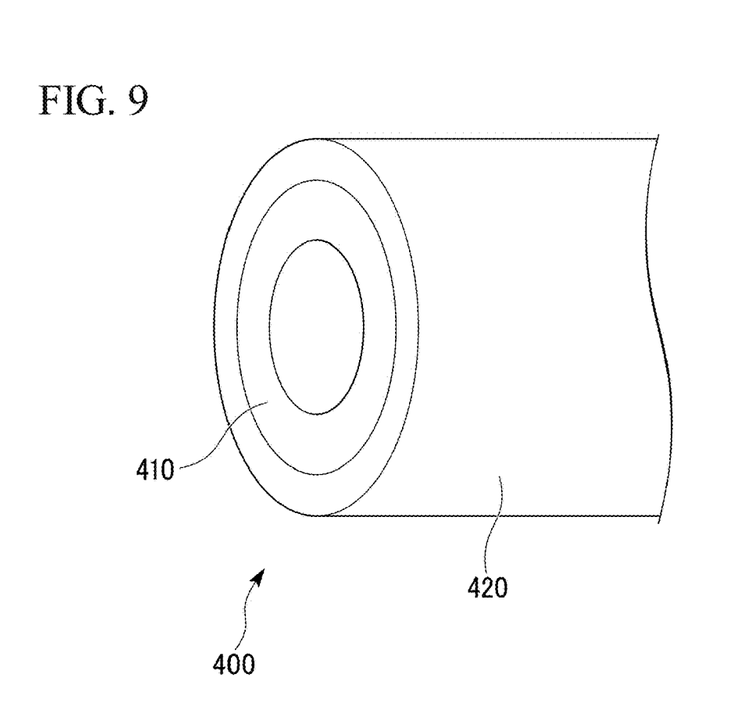
FIG. 9 is an external view of a porous copper composite part according to still another embodiment of the present invention.

As shown in FIG. 9, a porous copper composite part 400 in which a porous copper body 410 is bonded to an inner peripheral surface of a copper tube 420 as a main body of the composite part, may be employed.

Figure 10:
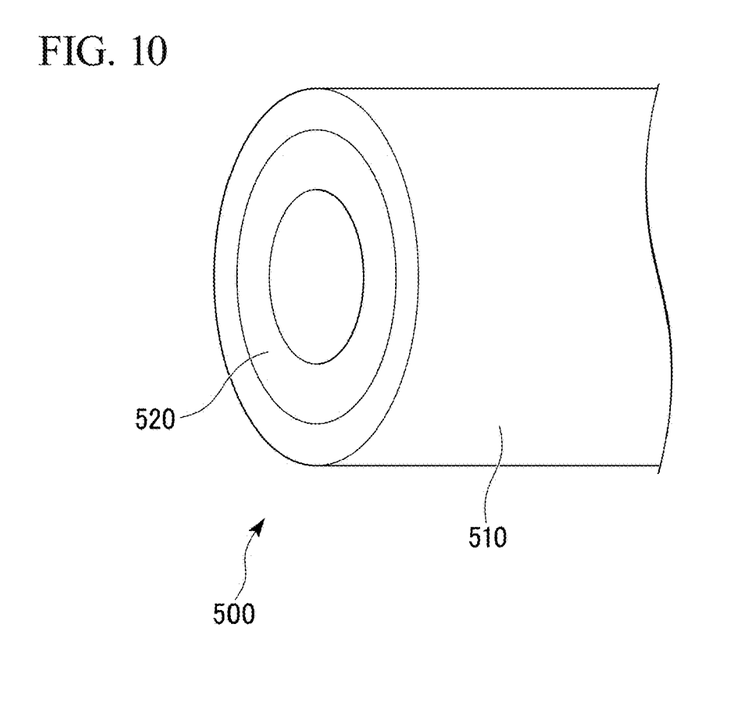
FIG. 10 is an external view of a porous copper composite part according to still another embodiment of the present invention.

As shown in FIG. 10, a porous copper composite part 500 in which a porous copper body 510 is bonded to an outer peripheral surface of a copper tube 520 as a main body of the composite part, may be employed.

Figure 11:
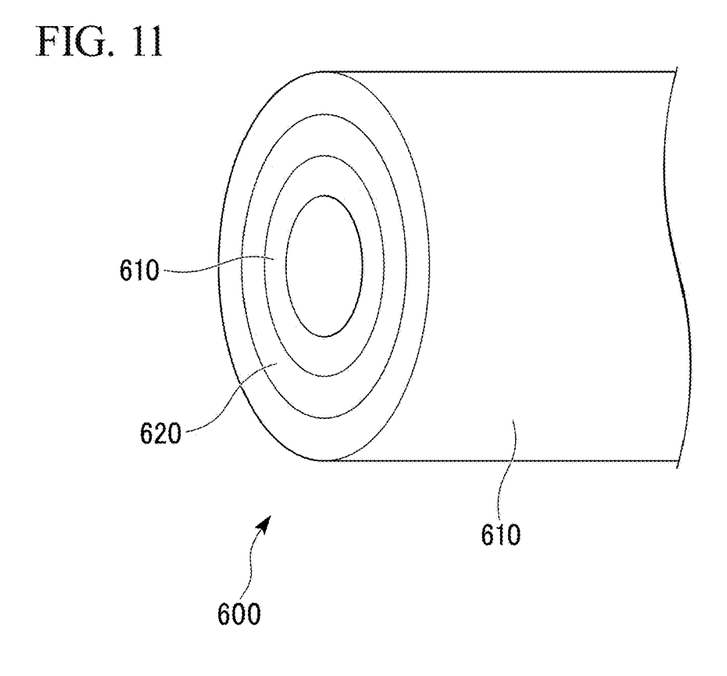
FIG. 11 is an external view of a porous copper composite part according to still another embodiment of the present invention.

As shown in FIG. 11, a porous copper composite part 600 in which porous copper bodies 610 are bonded to an inner peripheral surface and an outer peripheral surface of a copper tube 620 as a main body of the composite part, may be employed.

Figure 12:
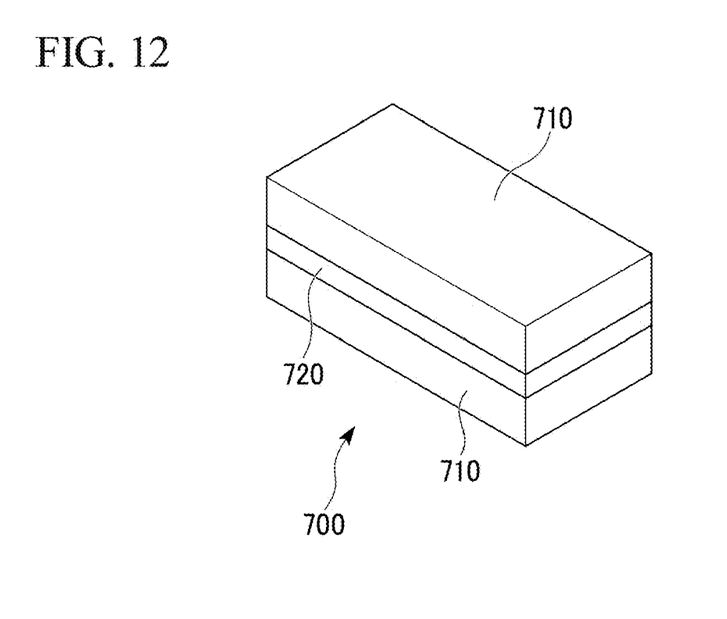
FIG. 12 is an external view of a porous copper composite part according to still another embodiment of the present invention.

As shown in FIG. 12, a porous copper composite part 700 in which porous copper body 710 are bonded to both surfaces of a copper plate 720 as a main body of the composite part, may be employed.

EXAMPLES

Hereinafter, results of a confirmation experiment carried out to confirm the effect of the present invention will be described.

Porous copper bodies including a skeleton with a three-dimensional network structure were manufactured using raw materials shown in Table 1. In Inventive Example 11, a porous material formed from fiber non-woven fabric was used.

In Inventive Example 8, prior to the oxidation-reduction treatment step, homogenization treatment was performed at 900° C. for 24 hours in a nitrogen atmosphere.

The oxidation-reduction treatment and recrystallization treatment were performed under conditions shown in Table 2 so as to manufacture porous copper bodies having 30 mm of width×200 mm of length×5 mm of thickness. In the Comparative Examples, the recrystallization treatment was omitted.

Regarding each of the obtained porous copper bodies, the diameter of a skeleton (skeleton diameter), porosity, and an average crystal grain size, specific surface area, relative tensile strength, relative electrical conductivity were evaluated. Evaluation results are shown in Table 3. An evaluation method will be described below.

Figure 13:
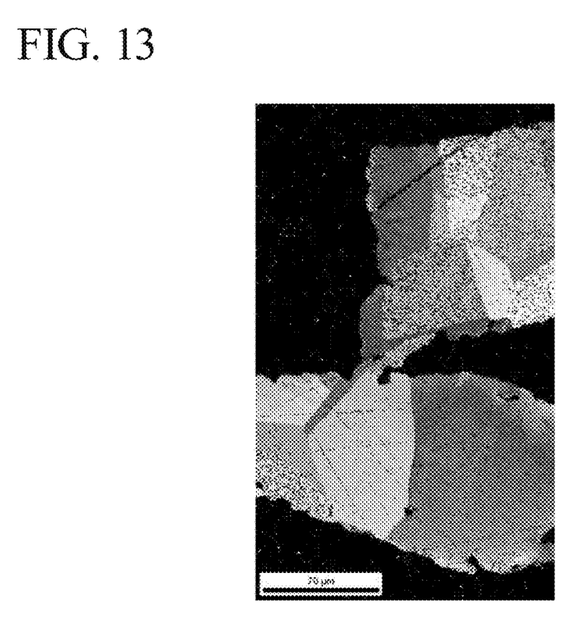
FIG. 13 is an EBSD observation image of a porous copper body according to Inventive Example 8.
Figure 14:
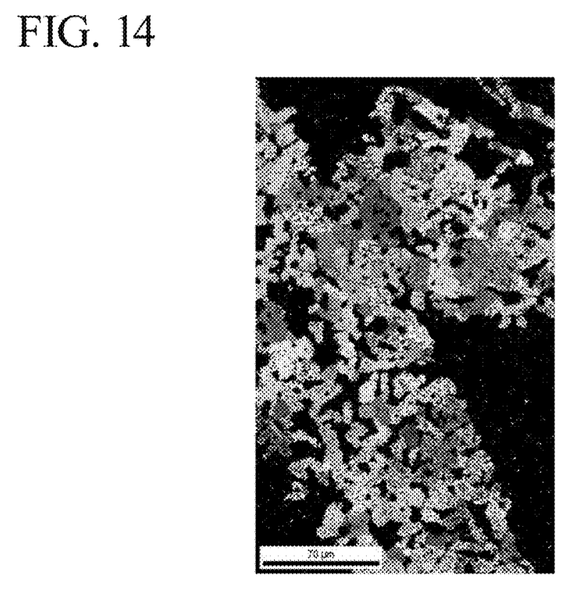
FIG. 14 is an EBSD observation image of a porous copper body according to Comparative Example 2.

The EBSD observation result of Inventive Example 8 is shown in FIG. 13, and the EBSD observation result of Comparative Example 2 is shown in FIG. 14.

(Skeleton Diameter R)

As the skeleton diameter R of the porous copper body, an average value of an equivalent circle diameter (Heywood diameter) $R=(A/\pi)^{0.5} \times 2$, which was calculated through image analysis on the basis of JIS Z 8827-1 using a particle analyzer "Morphologi G3" manufactured by Malvern Instruments Ltd., was used.

(Apparent Density Ratio $D_A/D_T$, and Porosity P)

A mass M (g) and a volume V (cm$^3$) of the obtained porous copper body, and a true density $D_T$ (g/cm$^3$) of the copper fibers constituting the porous copper body were measured, and the apparent density Ratio $D_A/D_T$, and the porosity P (%) were calculated using the following expressions. The true density $D_T$ was measured by an under-water method using a precision balance.

$$D_A/D_T = M/(V \times D_T)$$

$$P = (1 - (M/(V \times D_T))) \times 100$$

(Specific Surface Area $A_S$)

As the specific surface area $A_S$ (m$^2$/g) of the porous copper body, a value measured by BET method based on JIS Z 8830 using a krypton gas, was used.

(Average Crystal Grain Size $D_c$)

After samples were cut, polished, and subjected to an etching treatment, the crystal grain size was measured using an EBSD device (manufactured by TSL Solutions Co., Ltd.). At the time, the average crystal grain size $D_c$ was calculated using the following expression, in which let S be an area of all material except the pores, and let s1, s2, s3, . . . be areas of each of the crystal grains when let $d_1, d_2, d_3, \ldots$ be a grain size of each of the crystal grains.

$$Dc = d_1 \times (s_1/S) + d_2 \times (s_2/S) + d_2 \times (s_2/S) + \ldots$$

(Relative Tensile Strength $S_R$)

The obtained porous copper body was processed into a sample having 10 mm of width×100 mm of length×5 mm of thickness. Then, a tensile test was conducted using a universal tensile testing machine, and a maximum tensile load $S_{max}$ (N) was divided by an apparent sample sectional area of 50 mm$^2$, thereby measuring a maximum tensile strength S (N/mm$^2$). The maximum tensile strength S obtained by the above measurement varies depending on the apparent density. Therefore, in this example, the value $S/(D_A/D_T)$ obtained by normalizing the maximum tensile strength S (N/mm$^2$) using the apparent density ratio $D_A/D_T$, was defined as the relative tensile strength $S_R$ (N/mm$^2$) and compared.

(Relative Electrical Conductivity $C_R$)

A sample having 10 mm of width×500 mm of length×5 mm of thickness was cut out from the obtained porous copper body, and electrical conductivity $C_1$ (S/m) was measured by a four terminal method on the basis of JIS C 2525. The relative electrical conductivity $C_R$ (%) was obtained based on electrical conductivity $C_2$ (S/m) of a bulk material which constitutes the porous copper body and is made of copper or a copper alloy, and the apparent density ratio $D_A/D_T$ of the porous copper body using the following expression.

$$C_R (\%) = C_1/(C_2 \times (D_A/D_T)) \times 100$$

(Ratio $R_{CS}$ of Relative Electrical Conductivity to Relative Tensile Strength)

From the relative electrical conductivity $C_R$ and the relative tensile strength $S_R$ calculated as described above, a ratio $R_{CS}$ of relative electrical conductivity to relative tensile strength was calculated using the following expression.

$$R_{CS} = C_R/S_R$$

TABLE 1

| | | | Skeleton | | |
| | | Material | Raw material | Skeleton diameter (μm) | Homogenization treatment |
|---|---|---|---|---|---|
| Inventive Examples | 1 | Fiber | C1100 | 300 | Not performed |
| | 2 | Fiber | C1100 | 20 | Not performed |
| | 3 | Fiber | C1020 | 100 | Not performed |
| | 4 | Fiber | C1100 | 700 | Not performed |
| | 5 | Fiber | C1441 | 1000 | Not performed |
| | 6 | Fiber | C7060 | 60 | Not performed |
| | 7 | Fiber | C1100 | 60 | Not performed |

TABLE 1-continued

| | | Skeleton | | | |
|---|---|---|---|---|---|
| | | Material | Raw material | Skeleton diameter (μm) | Homogenization treatment |
| | 8 | Fiber | C1100 | 100 | Performed |
| | 9 | Fiber | C1100 | 60 | Not performed |
| | 10 | Powder | C1100 | 60 | Not performed |
| | 11 | Non-woven fabric | C1100 | 60 | Not performed |
| Comparative Examples | 1 | Fiber | C1100 | 1000 | Not performed |
| | 2 | Fiber | C1100 | 500 | Not performed |

TABLE 2

| | | Manufacturing process | | | | | | | |
|---|---|---|---|---|---|---|---|---|---|
| | | Oxidation treatment step | | | Reduction treatment step | | | Recrystallization step | | |
| | | Atmosphere | Temperature (° C.) | Time (min) | Atmosphere | Temperature (° C.) | Time (min) | Atmosphere | Temperature (° C.) | Time (min) |
| Inventive Examples | 1 | Air | 700 | 60 | $N_2$—3%$H_2$ | 900 | 60 | $N_2$ | 900 | 60 |
| | 2 | Air | 700 | 60 | Ar—3%$H_2$ | 900 | 30 | $N_2$ | 900 | 600 |
| | 3 | Air | 700 | 60 | $N_2$—3%$H_2$ | 1000 | 60 | $N_2$—3%$H_2$ | 320 | 1400 |
| | 4 | Air | 850 | 10 | $N_2$—3%$H_2$ | 700 | 60 | Ar | 1000 | 30 |
| | 5 | Air | 600 | 30 | $N_2$—3%$H_2$ | 600 | 10 | $N_2$ | 900 | 1000 |
| | 6 | Air | 520 | 280 | Ar—3%$H_2$ | 900 | 180 | $N_2$ | 450 | 700 |
| | 7 | Air | 700 | 60 | $N_2$—3%$H_2$ | 900 | 300 | $N_2$ | 1000 | 240 |
| | 8 | Air | 600 | 60 | $N_2$—3%$H_2$ | 900 | 60 | $N_2$ | 1000 | 10 |
| | 9 | Air | 700 | 60 | $N_2$—3%$H_2$ | 900 | 60 | $N_2$ | 600 | 60 |
| | 10 | Air | 900 | 10 | $N_2$—3%$H_2$ | 900 | 60 | $N_2$ | 900 | 180 |
| | 11 | Air | 700 | 60 | $N_2$—3%$H_2$ | 900 | 60 | $N_2$ | 900 | 120 |
| Comparative Examples | 1 | Air | 550 | 10 | $N_2$—3%$H_2$ | 700 | 10 | — | — | — |
| | 2 | Air | 700 | 60 | $N_2$—3%$H_2$ | 700 | 600 | — | — | — |

TABLE 3

| | | Porous copper body | | | | | | |
|---|---|---|---|---|---|---|---|---|
| | | Average crystal grain size $D_C$ (μm) | Ratio to skeleton diameter (%) | Apparent density $D_A$ (g/cm³) | Porosity P (%) | Specific surface area $A_S$ (m²/g) | Relative tensile strength $S_R$ (N/mm²) | Relative electrical conductivity $C_R$ (%) | $R_{CS}$ ($C_R/S_R$) |
| Inventive Examples | 1 | 16 | 5.3 | 1.3 | 85 | 0.18 | 11.1 | 12.2 | 1.1 |
| | 2 | 37 | 185.0 | 3.3 | 63 | 0.09 | 14.2 | 45.4 | 3.2 |
| | 3 | 23 | 23.0 | 2.4 | 73 | 0.08 | 18.4 | 23.9 | 1.3 |
| | 4 | 83 | 11.9 | 1.0 | 89 | 0.17 | 10.9 | 13.1 | 1.2 |
| | 5 | 348 | 34.8 | 1.5 | 83 | 0.02 | 12.6 | 17.6 | 1.4 |
| | 6 | 83 | 138.3 | 1.6 | 82 | 0.06 | 13.1 | 35.4 | 2.7 |
| | 7 | 139 | 231.7 | 1.7 | 81 | 0.02 | 12.5 | 47.5 | 3.8 |
| | 8 | 74 | 74.0 | 4.2 | 53 | 0.19 | 22.5 | 40.5 | 1.8 |
| | 9 | 175 | 291.7 | 1.2 | 87 | 0.18 | 10.9 | 51.2 | 4.7 |
| | 10 | 10 | 16.7 | 3.2 | 64 | 0.13 | 12.7 | 14.7 | 1.2 |
| | 11 | 25 | 41.7 | 1.1 | 88 | 0.15 | 14.5 | 23.2 | 1.6 |
| Comparative Examples | 1 | 3 | 0.6 | 1.0 | 89 | 0.005 | 10.7 | 3.7 | 0.3 |
| | 2 | 11 | 2.2 | 1.9 | 79 | 0.001 | 19.2 | 10.5 | 0.5 |

In each of Comparative Examples in which the recrystallization step was not performed, the average crystal grain size of the entirety including the skeleton and the oxidation-reduction layer was small, the diameter of the skeleton was 2.2% or lower, the ratio $R_{CS}$ of relative electrical conductivity to relative tensile strength was low.

On the other hand, in each of Inventive Examples in which the recrystallization step was performed, the average crystal grain size of the entirety including the skeleton and the oxidation-reduction layer was 5% or more of the diameter of the skeleton, and the ratio $R_{CS}$ of relative electrical conductivity to relative tensile strength was high.

As described above, it was confirmed that it is possible to provide a porous copper body particularly excellent in the thermal conductivity and electrical conductivity according to the Inventive Examples.

INDUSTRIAL APPLICABILITY

It is possible to provide a porous copper body with particularly excellent thermal conductivity and electrical conductivity, a porous copper composite part in which the porous copper body is bonded to a main body of the composite part, a method for manufacturing the porous copper body, and method for manufacturing the porous copper composite part. For example, the present invention is applicable to electrodes and current collectors in various batteries, heat exchanger components, silencing members, filters, impact-absorbing members, and the like.

REFERENCE SIGNS LIST 10, 110 Porous copper body
11 Copper fiber
12 Skeleton
100 Porous copper composite part
120 Copper plate (Main body of the composite part)

The invention claimed is:

1. A porous copper body, comprising:
a skeleton having a three-dimensional network structure,
wherein an oxidation-reduction layer formed by an oxidation-reduction treatment is provided on a surface of the skeleton,
the skeleton is constituted by a sintered body made of a plurality of copper fibers,
in each of the copper fibers, a diameter R is set to be in a range of 0.05 mm to 1.0 mm, and a ratio L/R of a length L to the diameter R is set to be in a range of 4 to 2500, and
an average crystal grain size of an entirety including the skeleton and the oxidation-reduction layer is in a range of 5% to 300% of a diameter of the copper fibers in the skeleton.

2. A porous copper composite part, comprising:
a main body of the composite part; and
the porous copper body according to claim 1 bonded to the main body of the composite part.

3. The porous copper composite part according to claim 2,
wherein a bonding surface of the main body of the composite part, to which the porous copper body is bonded, is made of copper or a copper alloy, and the porous copper body and the main body of the composite part are bonded to each other through sintering.

4. A method for manufacturing the porous copper body according to claim 1, comprising:
an oxidation-reduction treatment step of subjecting the skeleton to the oxidation-reduction treatment to form the oxidation-reduction layer; and
a recrystallization step of recrystallizing the skeleton and the oxidation-reduction layer.

5. The method for manufacturing the porous copper body according to claim 4,
wherein the skeleton is formed by sintering a copper raw material.

6. The method for manufacturing the porous copper body according to claim 4,
wherein prior to the oxidation-reduction treatment, the skeleton is subjected to a homogenization treatment.

7. A method for manufacturing a porous copper composite part which comprises: a main body of the composite part; and a porous copper body bonded to the main body of the composite part, comprising:
a bonding step of bonding the porous copper body manufactured by the method for manufacturing the porous copper body according to claim 4, and the main body of the composite part to each other.

8. The method for manufacturing a porous copper composite part according to claim 7,
wherein a bonding surface of the main body of the composite part, to which the porous copper body is bonded, is made of copper or a copper alloy, and the porous copper body and the main body of the composite part are bonded to each other through sintering.

9. The method for manufacturing the porous copper body according to claim 5,
wherein prior to the oxidation-reduction treatment, the skeleton is subjected to a homogenization treatment.

10. A method for manufacturing a porous copper composite part which comprises: a main body of the composite part; and a porous copper body bonded to the main body of the composite part, comprising:
a bonding step of bonding the porous copper body manufactured by the method for manufacturing the porous copper body according to claim 5, and the main body of the composite part to each other.

11. A method for manufacturing a porous copper composite part which comprises: a main body of the composite part; and a porous copper body bonded to the main body of the composite part, comprising:
a bonding step of bonding the porous copper body manufactured by the method for manufacturing the porous copper body according to claim 6, and the main body of the composite part to each other.

12. The method for manufacturing a porous copper composite part according to claim 10,
wherein a bonding surface of the main body of the composite part, to which the porous copper body is bonded, is made of copper or a copper alloy, and the porous copper body and the main body of the composite part are bonded to each other through sintering.

* * * * *